UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT FLOWABLE PYROXYLIN COMPOSITION OF MATTER.

SPECIFICATION forming part of Letters Patent No. 630,944, dated August 15, 1899.

Application filed January 17, 1899. Serial No. 702,400. (No specimens.)

*To all whom it may concern:*

Be it known that I, JOHN H. STEVENS, of the city of Newark, county of Essex, and State of New Jersey, have invented certain new and useful Improvements in Transparent Flowable Pyroxylin Compositions of Matter, of which improvements the following is a specification.

Pyroxylin or nitrocellulose is formed by subjecting cotton, paper, or other cellulose fiber to the action of nitric and sulfuric acids. It is a substance which presents many varieties or kinds, dependent on the reaction between the cellulose and nitrous elements of the acid-bath.

The classification of pyroxylin has been based on the amount of nitrogen or nitro elements present, but also and chiefly on its solubility in different menstrua known as "solvents of pyroxylin."

In making flowable solutions for use in the arts, as varnishes and lacquers, and for waterproofing purposes the classification based on solubility is practically the only one kept in view. Hence the compositions to which my invention pertains demands a pyroxylin which is soluble in the ordinary liquid menstrua, such as wood-spirit, acetone, methyl acetate, amyl acetate, alcohol ether, acetic ether, &c., all of which are well known and used for these purposes.

The strictly chemical classification of pyroxylin, which is based on the amount of nitrogen contained, is useful for explosives, and the varying solubility even of the pyroxylins having the same chemical composition is of less importance in making explosives than the amount of nitrogen present, because it is the amount of nitrogen-gas liberated on explosion which determines the usefulness of the pyroxylin employed for that purpose.

Pyroxylin compounds can be divided into many classes. One of the important classes, however, is that of collodions or flowable solutions, which are made by simply dissolving an ordinary soluble pyroxylin in sufficient solvent to form a solution which can be flowed or spread.

While many pyroxylin compounds are of a non-transparent nature, there are certain purposes for which high transparency is desirable, especially in the final film deposited after the solvents have been evaporated.

Pyroxylin and its compounds are more or less liable to a decomposition, which results in the generation of free acid. The presence of solvents or the dissolved condition hinders this tendency; but unless a preservative substance is present to prevent this decomposition there is always danger of the evolution of acid, which is especially detrimental to the final film deposited on drying, because a film of an acid nature will attack metals, lose its luster, and be otherwise damaged. While this decomposition is more liable to affect solid pyroxylin compounds, and especially those which are subjected to heat, it is nevertheless an injury to the liquid compounds, although this has not been generally recognized.

I have traced many of the imperfections in liquid compounds to the decomposed condition of the unprotected pyroxylin. I have observed even highly-fluid solutions turn acid to such extent that they would strongly corrode metals dipped into them, and I have found that much of the discoloration often observed in films made from evaporated solutions is due to this decomposition.

While there are plenty of known means of securing stability in non-transparent pyroxylin solutions and while there are plenty of substances known which will dissolve in pyroxylin solvents and form a transparent mixture so long as the solvent is present, there are very few substances known which will dry transparent in the final film and at the same time act as preserving agents, so as to keep the film in a permanent neutral condition without causing discoloration, lack of surface brilliancy, or other defects. Hence any composition of matter which has the desired properties depends on study and experiment, especially with proportions, the properties of substances, and their behavior during the evaporation of the solvents and final solidifying of the residues.

While, as before stated, little attention has been given to the stability of these flowable preparations, the difficulties in obtaining suitable antacid or preserving agents for explosives and solid manufacturing compounds have shown that successful antacid agents must necessarily be selected from a large number of substances which might be expected to yield good results, but which fail because they do not meet the requirements.

Experience has shown that some substances while known as neutralizers of acid injure nitrocllulose compounds by aiding or inviting decomposition. I have found that some substances cause discoloration and some are incompatible with transparency.

The present invention is based on the peculiar properties residing in certain solid and liquid bodies which are non-solvents of the pyroxylin commonly employed in making flowable solutions, and its distinctive novelty depends on my discovery that the important properties of transparency and chemical permanency, especially in the dried film or final product, are indispensably associated with the proportions of these bodies used. As a further proof of the novel use I make of these new bodies I can state that while a few of them have been suggested to be used in connection in a limited way with a certain kind of pyroxylin known as "tetranitrocellulose" and in larger proportions than would be useful in my compounds they have been so suggested as equivalents for a number of other bodies which are totally unfit for my purposes in any proportion, for these bodies would fail to give chemical stability and many of them would be detrimental in other respects.

The group of bodies to which I refer consists of certain metallic salts of lactic acid. By "lactic acid" I mean the ordinary commercially-pure lactic acid, which generally consists of varying proportions of alpha and beta lactic acid and small quantities of other compounds. The salts of lactic acid are easily made by simply combining the commercial lactic acid with the different metallic bases. This is well understood by chemists.

My experiments disclose that while all the inorganic salts of lactic acid have more or less preserving power there are some among them which are not of practical application in the flowable pyroxylin solutions, and the success of my invention depends on the use of one or more of the group of equivalent lactic salts, consisting of the lactates of sodium, potassium, calcium, lithium, barium, lead, and strontium. For wood-spirit solutions, or those containing wood-spirit, the lactates of sodium, potassium, calcium, and lithium are useful, because these salts are sufficiently soluble in wood-spirit. On account of the difficult solubility in ethyl alcohol of many salts which belong to this class the lactates of sodium and potassium (and possibly lithium) are practically the only ones to be recommended when alcohol is employed as the only alcoholic solvent. The lithium salt can, however, be used with alcohol when that solvent is used in large proportions.

The lactic salts are more soluble as a rule in wood-spirit than they are in alcohol. Should the operator desire to use the salts which are difficultly soluble in alcohol or wood-spirit—as, for instance, the lead and barium salts—he can effect a combination by first mixing the lactic salt with pyroxylin and enough solvent to produce a stiff mixture suitable for mastication in the rolls and then convert or form a thorough combination of this mixture by the usual method, and most readily when camphor forms part of the solvent, after which it can be dissolved in the large body of liquid solvent to form a liquid solution. By this means I find that difficultly-soluble antacids combine much better than by the ordinary process, probably by reason of a minute subdivision or refusal to precipitate when once thoroughly dissolved in with the pyroxylin by the heat and friction of the converting-rolls. A good proportion is one per cent. to the weight of pyroxylin present in the mixture. More (up to a certain amount) or less can be used; but the operator must bear in mind that a less amount will give decreased stability, although I find that in these compounds one-half of one per cent. gives very fair stability. As to larger proportions, they will tend to cloud or weaken the compounds, especially in the residues after evaporation, unless they are employed in moderation. The salts soluble in alcohol are detrimental to the compounds if more than five per cent. is employed. Their solubility in alcohol can be determined by actual test or from books of chemistry, the former method being more reliable. When five per cent. is exceeded, the use of such solutions results in clouded and discolored films, which are also apt to be injured by water and become porous and lusterless.

As examples of my mixtures, the following will suffice: wood-spirit, one thousand parts; methyl acetate, two thousand parts; pyroxylin, one hundred parts; sodium lactate, one part. The above is useful as a lacquer.

The following is a good spreading solution for cloth: wood-spirit, two hundred parts; fusel-oil, two hundred parts; methyl acetate, two hundred parts; camphor, one hundred parts; castor-oil, one hundred parts; pyroxylin, one hundred parts; sodium lactate, one part.

The manufacture of flowable pyroxylin solutions is well understood by operators in this art. The particular solvent employed and the fluidity or stiffness of the solutions are questions of judgment based on what is well known of the properties of the ingredients and the application to be made of the mixtures. Some of the most important compounds are in the condition of a paste which is applied to cloth or other surfaces by spreading machinery.

By "flowable" solutions I mean such solutions as can be flowed or spread, as distinguished from solutions which are too stiff to be worked in the cold. The non-flowable solutions are solid pyroxylin compounds, which generally are manipulated in rolls or equivalent mixing machinery and then formed into shape afterward by being pressed into masses or blocks which, if desired, can be cut into sheeting. These compounds are also forced through nozzles into such forms as tubes, rods, and strips.

The other salts of lactic acid which I have referred to as inapplicable for practical purposes in liquid compounds of this invention are represented by such substances as lactate of iron, lactate of magnesium, lactate of manganese, and lactate of ammonium, all of which discolor or otherwise injure the liquid solutions. In proportions about five per cent. there is no question as to the inapplicability of such salts for these antacid purposes. Lactate of ammonium, for instance, actually assists chemical change and forms brown and cloudy residues or films.

While as applied to those salts soluble in alcohol I have mentioned five per cent. as the top proportion beyond which they are useless for my purposes, I find that I can use even more than five per cent. where the salt is easily soluble in wood-spirit and practically insoluble in alcohol. An example of such salt is "lactate of calcium." While I am not specially confined, therefore, when using lactate of calcium, for instance, to a proportion below five per cent., I would nevertheless recommend that the proportions I have given be adhered to for the best effects.

While my experiments have proved that all of the slats of lactic acid are preservers of pyroxylin, I have no explanation to offer for this peculiar action in salts in which the bases have already been saturated with an acid. For instance, my lactate of potassium is a salt in which the acid and base completely neutralize each other, or, in other words, a salt in which the base has taken up all the acid that it will hold in a neutral condition. I can only state, however, the simple fact that they possess this power. As possibly throwing light on the question I can state that, other things being equal, the nature of the acid radical present in the salt determines its preserving power, although this in a certain sense, as already indicated, is complicated with the fact that the different bases in forming antacid salts exhibit variations in their influence on the compatibility of the salt with the other ingredients used in pyroxylin compounds. My experiments also show that in the case of salts of acids containing two or more dissimilar acid radicals the preserving power depends on the nature of the acid. Thus a salt containing a radical of lactic acid would have some preserving power even though the other acid radical present possessed no power to form antacid salts.

I have found, for instance, that lactophosphate of sodium possesses antacid power, though phosphate of sodium is practically inefficient for that purpose. Sodium-calcium lactate is a good example of a double lactate salt. Similarly the salts containing two or more bases—for instance, sodium-calcium lactate—are good preservers, according to the properties of their constituents.

Perfect solubility of the salt or compound in the solvent employed and the ability to form highly-transparent effects do not give the salt or compound useful antacid power, for I have found that chlorid of calcium dissolves in wood-spirit, while it is of no use for antacid purposes in my compounds.

Besides lacking the necessary preserving power, I find that compounds made with deliquescent chlorids attract moisture, and hence articles coated with a pyroxylin compound containing chlorid of calcium become wet on the surface, attract dust, and lack the necessary luster.

While the chlorid salt can be washed away from the surface, it is always liable to exude from the body of the material and form fresh deposits.

I am aware that the inorganic salts of lactic acid soluble in ninety-five per cent. ethyl alcohol (i. e., at least sufficiently soluble to make an alcoholic solution containing about five per cent. of the salt) have been proposed as solvents of tetranitrocellulose in connection with alcohol and methylated spirits and as substitutes and equivalents for calcium chlorid and zinc chlorid, as well as certain known powerfully-solvent esters and acetic, oxalic, lactic, and hydrochloric acids and other substances totally unfit for my purposes.

Most of the salts of lactic acid are so insoluble in alcohol that they cannot be included among those proposed for solvent purposes. Hence this classification of solvent usefulness by limits of solubility in alcohol excludes some of my most valuable antacids—for instance, the lactates of calcium and lithium.

It necessarily requires such excessive proportions of solvent for flowable solutions that the suggested proportions of lactic salts are very much larger than the proportions I have found to be useful. While a solution of tetranitrocellulose in alcohol containing about five per cent. of a soluble lactic salt would doubtless present a transparent appearance, any attempt to evaporate the solution would result in a film which would be dimmed by a separation of the salt, besides which it is by no means certain that the lactic salts soluble in alcohol have been suggested for use in flowable solutions of even the particular kind of pyroxylin known as "tetranitrocellulose," because such suggestion has always been coupled with instructions to select such from among the numerous solvents mentioned as would be best fitted for the special purpose in view. As the other substances mentioned included strong solvent esters more suitable for flowable solutions, it is not even certain that any of my lactate salts have been suggested to be used in flowable solutions. The fact that none of the various kinds of pyroxylin commonly used in making flowable solutions are soluble in an alcoholic solution of any of the inorganic lactate salts has a bearing on this point. For instance, ninety-five per cent. ethyl alcohol containing five per cent. of sodium lactate or even saturated therewith will not dissolve ordinary pyroxylin even at the end of two days' contact. The solvent power of absolute ethyl alcohol is destroyed when sodium lactate is added to it. The strong commercial wood-spirit, which is a powerful and rapid solvent, loses its solvent power in direct proportion as the lactic salts are added. The more soluble the salt the greater is the weakening effect. Practically all of the ordinary grades of manufactured pyroxylin are insoluble in a saturated solution of sodium lactate and wood-spirit. I believe, therefore, that I am the first to discover and apply the proper proportions of the inorganic salts of lactic acid for manufacturing a flowable transparent pyroxylin compound which will remain transparent when evaporated to a dry residue or film.

While I include in my invention the present group of inorganic salts of lactic acid as preserving agents for transparent pyroxylin flowable solutions, whether the salts are simple, compound, mixed, or combined chemically with other salts or compounds, I exclude any combination of the salts of this specification with phosphoric acid, for such compounds have already been secured to me in United States Patent No. 610,615, of September 13, 1898, which patent includes such substances as lactophosphate of potassium, &c.

In the United States Letters Patent granted to me April 4, 1899, No. 622,293, I have described and claimed the use of the inorganic salts of lactic acid herein referred to when used in pyroxylin compounds containing camphor as an ingredient; but my present invention is based on the discovery that the inorganic salts of lactic acid herein referred to and described are useful as a preservative of pyroxylin compounds which do not contain camphor when used as herein described and set forth.

Having thus fully described my invention, what I claim, and desire to secure by Letters Patent, is—

1. A flowable, transparent composition of matter consisting of pyroxylin, a solvent of the same, and a member of the group of metallic salts of lactic acid consisting of lactate of sodium, lactate of potassium, lactate of calcium, lactate of strontium, lactate of barium, lactate of lithium, and lactate of lead, the said salt being present in the compound in proportion not exceeding five per cent. of the pyroxylin, substantially as described.

2. A flowable, transparent composition of matter consisting of pyroxylin, a solvent of the same, and one or more members of the group of metallic salts of lactic acid consisting of lactate of sodium, lactate of potassium, lactate of calcium, lactate of strontium, lactate of barium, lactate of lithium, and lactate of lead, the said salt being present in the compound in proportion not exceeding five per cent. of the pyroxylin, substantially as described.

JOHN H. STEVENS.

Witnesses:
ABRAHAM MANNERS,
SILVESTER B. SCHENCK.